United States Patent [19]

Sewall et al.

[11] Patent Number: 5,624,612
[45] Date of Patent: Apr. 29, 1997

[54] NONAGGREGATING HYDROCOLLOID MICROPARTICULATES, INTERMEDIATES THEREFOR, AND PROCESSES FOR THEIR PREPARATION

[75] Inventors: Christopher J. Sewall, Princeton, N.J.; Donald W. Renn, Glen Cove; Peter J. Riley, Camden, both of Me.; William R. Thomas, Newtown, Pa.; Lisa E. Dumont, Rockport, Me.; Guy A. Crosby, Princeton, N.J.

[73] Assignee: FMC Corporation, Philadelphia, Pa.

[21] Appl. No.: 476,989

[22] Filed: Jun. 7, 1995

Related U.S. Application Data

[62] Division of Ser. No. 111,800, Aug. 25, 1993.

[51] Int. Cl.$^6$ .............................. B01J 13/02; B01J 13/04
[52] U.S. Cl. .............................................. 264/4.1; 264/4.3
[58] Field of Search ........................................ 264/4.1, 4.3

[56] References Cited

U.S. PATENT DOCUMENTS

| | | |
|---|---|---|
| 2,438,450 | 3/1948 | Nelson . |
| 3,527,712 | 9/1970 | Renn et al. . |
| 3,573,058 | 3/1971 | Tiemstra . |
| 3,936,573 | 2/1976 | Brockett . |
| 4,143,201 | 3/1979 | Miyashiro et al. . |
| 4,192,900 | 3/1980 | Cheng . |
| 4,305,964 | 12/1981 | Moran . |
| 4,350,765 | 9/1982 | Chibata et al. . |
| 4,882,426 | 11/1989 | Motozato . |
| 4,911,946 | 3/1990 | Singer . |
| 4,952,686 | 8/1990 | Renn et al. . |
| 4,956,128 | 9/1990 | Hommel et al. . |
| 5,082,684 | 1/1992 | Fung . |
| 5,153,020 | 10/1992 | Singer et al. . |

FOREIGN PATENT DOCUMENTS

| | | |
|---|---|---|
| 0011345 | 11/1979 | European Pat. Off. . |
| 0380225 | 1/1990 | European Pat. Off. . |
| 0437360A1 | 10/1991 | European Pat. Off. . |
| 04008257 | 1/1992 | Japan . |
| 1577955 | 10/1976 | United Kingdom . |
| WO8303102 | 9/1983 | WIPO . |
| WO9119424 | 12/1991 | WIPO . |
| WO9302571 | 2/1993 | WIPO . |

OTHER PUBLICATIONS

J.C. Ogbanna, et al., "Production of Micro–Gel Beads by a Rotating Disk Atomizer", *J. Ferment. Bioeng.* 68(1), 40–48, 1989.

R.M. Buitelaar, A.C. Hulst, J. Tramper, "Immobilization of biocatalysts in thermogels using the resonance nozzle for rapid drop formation and an organic solvent for gelling", *Biotechnology Techniques* 2(2), 109–114, 1988.

H. Su, R. Bajpai, G.W. Preckshot, "Characterization of Alginate Beads Formed by a Two Fluid Annular Atomizer", *Applied Biochemistry and Biotechnology*, 20/21, 561–569, 1989.

Dry Particulate Products (Brit. 887.901), CA 56, 9179; (1961).

P. Audet and C. Lacroix, "Two–phase Dispersion Process for the Production of BioPolymer Gel Beads: Effect of Various Parameters on Bead Size and Their Distribution", *Process Biochemistry*, Dec. 1989, 217–226.

M.R. Chaudhari, et al., "Preparation of Crosslinked Starch Beads as a Medium for Gel Filtration", *Starch/Starke*, 41(11) 415–416, 1989.

S. Hjerten, "The Preparation of Agarose Spheres for Chromatography of Molecules and Particles", *Biochem. Biophys. Acta.*, 79, 393–398, 1964.

M. Wada, J. Kato, I. Chibata, "A New Immobilization of Microbial Cells", *Eur. J. Appl. Microbiol Biotechnology*, 8, 241–247 (1979).

A.R. Navarro, M.C. Rubio, D.A.S. Callieri, "Productionof Ethanol by Yeasts Immobilized in Pectin", *Eur J. Appl. Microbiol Biotechnology*, 17, 148–151 (1983).

K. Nilsson, et al., "Entrapment of Animal Cells for Production of Monoclonal Antibodies and Other Biomolecules", *Nature*, 302, 629–30, 1983.

V. Ghetie and H.D. Schell, "Drying of Agarose Gel Beads", *Experientia* 27 (12), 1384–5, 1971.

*Primary Examiner*—Nathan M. Nutter
*Attorney, Agent, or Firm*—Polly E. Ramstad; Mark A. Greenfield; Robert L. Andersen

[57] ABSTRACT

Substantially dry, rehydratable, water-dispersible, gel-forming, porous hydrocolloid microparticulates containing internally or internally and externally at least one water-soluble, non-gelling, hydration enhancing hydrocolloid, processes and intermediates for their preparation, and their uses.

12 Claims, No Drawings

NONAGGREGATING HYDROCOLLOID MICROPARTICULATES, INTERMEDIATES THEREFOR, AND PROCESSES FOR THEIR PREPARATION

This application is a divisional of application Ser. No. 08/111,800, filed 25 Aug. 1993.

BACKGROUND OF THE INVENTION

1. Field of the Invention

The present invention relates to microparticulate hydrocolloids, having particular utility as fat replacement components in comestibles.

2. Statement of Related Art

The literature and patent records are replete with discoveries in the field of hydrocolloids, including microparticulate forms thereof.

Many techniques have been used to prepare hydrocolloid microparticles, such as spray processes and emulsion processes. See, e.g. PCT WO 91/19424; EP-A 0437360 A1; U.S. Pat. Nos. 5,082,684; 4,956,128; J. C. Ogbanna et al., "Production of Micro-Gel Beads by a Rotating Disk Atomizer", *J Ferment Bioeng.* 68(1), 40–48, 1989; R. M. Buitelaar, A. C. Hulst, and J. Tramper, "Immobilization of biocatalysts in thermogels using the resonance nozzle for rapid drop formation and an organic solvent for gelling", *Biotechnology Techniques* 2(2), 109–114, 1988; H. Su, R. Bajpai, and G. W. Preckshot, "Characterization of Alginate Beads Formed by a Two Fluid Annular Atomizer", *Applied Biochemistry and Biotechnology*, 20/21, 561–569, 1989; P. Audet and C. Lacroix, "Two-phase Dispersion Process for the Production of BioPolymer Gel Beads: Effect of Various Parameters on Bead Size and Their Distribution", *Process Biochemistry*, December 1989, 217–226; M. R. Chaudhari et al., "Preparation of Crosslinked Starch Beads as a Medium for Gel Filtration", *Starch/Stärke*, 41(11) 415–416, 1989; S. Hjertén, "The preparation of agarose spheres for chromatography of molecules and particles", *Biochem. Biophys. Acta.*, 79, 393–398, 1964; Y. Motozato, "Beads of cross-linked glucomannan and production thereof", U.S. Pat. No. 4,882,426 (Nov. 21, 1989); and British Patent No. 1,577,955 to Takeda Chemical Industries.

In addition, the following references describe methods for encapsulating other materials within the microparticles:

U.S. Pat. No. 4,956,128 ti Hommel et al.; U.S. Pat. No. 4,143,201, U.S. Pat. No. 3,936,573 to Brocket; I. Chibata, J. Kato, and M. Wada, "Method for Producing Ethanol with Immobilized Microorganism", U.S. Pat. No. 4,350,765 (Sep. 21, 1982); M. Wada, J. Kato and I. Chibata, "A New Immobilization of Microbial Cells", *Eur J. Appl. Microbiol Biotechnolog*, 8, 241–247 (1979); A. R. Navarro, M. C. Rubio, and D. A. S. Callieri, "Production of Ethanol by Yeasts Immobilized in Pectin", *Eur. J. Appl. Microbiol Biotechnology*, 17, 148–151 (1983); K. Nilsson et al., "Entrapment of animal cells for production of monoclonal antibodies and other biomolecules", *Nature* 302, 629–30, 1983; and K. Mosbach, and K. Nilsson, "A method of encapsulating bio material in bead polymers", PCT Application WO 83/03102 (Sep. 15, 1983). Tiemstra U.S. Pat. No. 3,573,058 discloses a codried mixture of microcrystalline cellulose and small quantities of a hydrocolloid. U.S. Pat. No. 4,192,900 discloses starch particles comprising starch mixed with a gelling hydrocolloid.

The following references relate to specialized techniques for drying hydrocolloid microparticulates in order to try to prevent agglomeration of the microparticulates which will otherwise occur:

British patent No. 887,901 to F. Hoffman-La Roche & Co. (CA 56, 9179 i(1961)) discloses emulsions of a gelling colloid, including pectin and algin, which are dried into particles by spraying or atomizing into a gas at least 10° below the $t_m$ of the resultant gel, and the particles are kept separate in free fall for at least 15 seconds for gelling to begin. Nelson U.S. Pat. No. 2,438,450 discloses a drying technique for microparticulates comprising mixing with the hydrated microparticulates a quantity of previously dried microparticulates to prevent agglomeration of the hydrated microparticles. V. Ghetie and H. D. Schell, "Drying of Agarose Gel Beads", *Experientia* 27(12), 1384–5, 1971 discloses agarose microparticles which are acetone washed, then air dried at room temperature.

In addition to the above specialized drying techniques for minimizing agglomeration problems, other techniques have been used to try to prevent agglomeration of hydrocolloid microparticles. For example, Singer et al. U.S. Pat. No. 5,153,020, discloses water-dispersible spheroidal macrocolloid microparticles as a fat substitute with which "aggregate blocking agents" such as lecithin, pectin, xanthan gum, and carboxymethylcellulose, are added to the macrocolloid particles to stabilize the particles in the hydrated form in which the particles are manufactured and employed as fat substitutes.

U.S. Pat. No. 4,911,946 discloses the use of aggregate blocking agents such as lecithin and xanthan gum in hydrated spheroidal carbohydrate microparticles to produce the mouth feel of fat/cream.

The following references disclose microparticles containing an inner core which can be a hydrocolloid, and an outer hydrophobic coating of a digestible fat: U.S. Pat. No. 4,305,964; EP-A 0 011 345; and EP-A0 380 225.

U.S. Pat. No. 3,527,712 discloses a process of preparing chromatography-size agarose beads by including within an agarose gel a macromolecular hydrocolloid such as sodium alginate, potassium lambda carrageenan, carrageenan, hydroxymethylcellulose, sodium carboxymethylcellulose, and the like. Upon drying the agarose beads the macromolecular hydrocolloid becomes coagulated within the pore of the agarose. Upon rehydration, the macromolecular hydrocolloid dissolves, leaving the porosity of the gel substantially intact for its intended use in chromatography.

Renn et al U.S. 4,952,686, discloses an alloy gum of cassia gum and a gelling and thickening agent such as carrageenan, agar, agarose, hydroxyethylcellulose, carboxymethylcellulose, dextran, and the like. This alloy gum when dried and ground into a powder can be readily dissolved in water to form a clear, stable colloidal solution.

Japanese patent publication 04/08,257 (92/08,257) (CA 116: 172746C) discloses the manufacture of dry konjac, which can be soaked in water to restore its original state and organoleptic properties, by mixing konjac with mono- and/or oligosaccharides such as glucose, sucrose, maltose, lactose and fructose, and then drying the mixture.

WO 91/19424 (PCT published application) discloses hydrated microparticulate beads as a fat substitute composed of a hydrous hydrocolloid gel, a metal capable of causing gellation, and an ionic polysaccharide such as alginate, pectate, and sodium carboxymethylcellulose.

Despite the extensive art as exemplified above relating to hydrocolloids and microparticulate forms thereof, no universally applicable techniques for drying and rehydrating such microparticulates without resulting in agglomeration of the microparticles and failure to disperse in water have been disclosed in the art. This is perhaps not surprising since gel-forming hydrocolloid microparticles exhibit very strong propensities to aggregate when wet or even in the presence of limited moisture such as when the dry microparticles are stored in contact with air. In fact, microparticulates made from gel-forming hydrocolloids alone cannot be dried and then rehydrated without specialized drying techniques to prevent agglomeration, since the dried agglomerates will not disperse or will disperse very poorly in the presence of water upon attempted rehydration. Agglomerated microparticulates cannot be used as a fat substitute since they do not possess the required organoleptic properties. It is therefore essential that dried microparticulates be capable of rehydration to their original size and shape in order to closely mimic the organoleptic properties of fat, especially in oil-in-water emulsions. This problem of agglomeration when rehydrated is not shared, or is shared to only a limited extent, with larger size hydrocolloid particles such as those disclosed in U.S. Pat. Nos. 3,527,712 and 4,952,686.

SUMMARY OF THE INVENTION

Hydrocolloid microparticulates that can be dried without necessitating special drying techniques and processes for their production have now been discovered. The dried microparticulates, even when prepared in the form of a coagulate, can be successfully rehydrated to any desired extent, including aqueous dispersions thereof, without aggregation problems. Also, if desired, and in order to facilitate redispersion, dry coagulate forms of the microparticulates can be ground or otherwise comminuted without harm to the microparticulates.

In a first embodiment of the process of the invention, the process is carried out in the following steps:

A) preparing microparticulates of a gel-forming hydrocolloid by any operable technique, including those already known to the art;

B) contacting the hydrocolloid microparticulates with at least one water-soluble, non-gelling, hydration enhancing hydrocolloid in an aqueous medium; and C) drying the resulting hydrocolloid microparticulates.

The hydrocolloid microparticulates produced by the above process are substantially dry, water-dispersible, porous, gel-forming hydrocolloid microparticulates having occluded in the pores and on at least a portion of the outer surfaces thereof the water-soluble hydration enhancing hydrocolloid material.

In a second embodiment of the process of the invention, the process is carried out in the following steps:

A) forming an aqueous composition comprising at least one gellable hydrocolloid and at least one water-soluble, non-gelling, hydration enhancing hydrocolloid;

B) forming hydrocolloid microparticulates from the aqueous composition of step A); and C) drying the resulting hydrocolloid microparticulates.

The hydrocolloid microparticulates produced by the above process are substantially dry, water-dispersible, gel-forming hydrocolloid microparticulates containing at least internally in the pores thereof a water-soluble, non-gelling, hydration enhancing hydrocolloid.

DETAILED DESCRIPTION

Other than in the operating examples, or where otherwise indicated, all numbers expressing quantities of ingredients or reaction conditions used herein are to be understood as modified in all instances by the term "about".

The gel-forming hydrocolloids used in the present invention for the manufacture of the matrix of the substantially dry microparticulates of the invention include but are not limited to the following: agars; agaroses; algins; low methoxyl pectins; gellans; K-carrageenan; ι-carrageenan; furcellaran; β-carrageenan; curdlan; chitosan; konjac glucomannan and derivatives thereof including heat stable cold-melt konjac glucomannan; cellulose derivatives; starches; and mixtures of two or more of the foregoing, as well as hydrocolloid mixtures such as xanthan/locust bean gum; locust bean gum/agar; cassia/agar; cassia/xanthan; konjac/xanthan; carrageenan/locust bean gum; konjac/carrageenan; and konjac/starch. The gel-forming hydrocolloid mixtures given above are employed in a weight ratio of from 80:20 to 20:80, preferably 60:40 to 40:60. When used herein, the term "konjac" should always be understood as referring to the glucomannan derived from konjac and specifically from species of Amorphophallus including, but not limited to, $A.$ $oncophyllus$ and $A.$ $rivieri$, unless indicated otherwise.

The above gel-forming hydrocolloids can be present in their native state, or can be partially depolymerized or in the form of their derivatives, provided they form gels in such variant forms. Hydrocolloids can be selected that are thermoreversible, such as agar, agarose, K-carrageenan, ι-carrageenan, β-carrageenan and xanthan/locust bean gum, or thermoirreversible, such as alkali-set konjac, curdlan, and calcium elginate.

It is to be understood that while some of the above hydrocolloids will form gels without further treatment, many others require conversion to their potassium and/or alkaline earth metal salts, such as the calcium or magnesium salt, and such salt forms are the gel forming hydrocolloids used in the invention. Methods for preparing such salts are well known in the art and do not comprise part of the present invention.

Heat stable, cold-melt konjac is particularly preferred for use herein as a gel-forming hydrocolloid, since heat-stable properties are ideal for use in foodstuffs that require heat processing. Carrageenans are also preferred gel-forming hydrocolloids.

The water-soluble, non-gelling, hydration enhancing hydrocolloid materials that can be used alone or in combinations in the practice of the invention are water-soluble, non-gelling hydrocolloids such as the following: galactomannans, e.g., water-soluble locust bean gum, guar gum, cassia, tara, and the like; water-soluble forms of konjac; starches, such as corn, potato, cereal, and tapioca; water-soluble cellulose derivatives, e.g., carboxymethylcellulose and hydroxymethylcellulose and their sodium salts; water-soluble synthetic polymers, e.g., linear polyacrylamide, PVA, PEG, PEO, PVP, and the like; λ-carrageenan or the sodium salts of algin or pectin; water-soluble xanthan gum; and the like.

The substantially dry, rehydratable, non-aggregating, water-dispersible, gel-forming hydrocolloid microparticulates of the invention have an average diameter when rehydrated in the range of 0.1 to 150 microns, preferably 1 to 50 microns, and more preferably from 5 to 30 microns. They are preferably substantially spheroidal in shape, although other physical forms of the microparticulates can be made, depending on the manufacturing process, including ovoids, teardrops, and irregular shapes. A substantially spherical form is the most desirable shape since this shape best mimics the lubricity obtained by an oil-in-water emulsion. Upon rehydration of the dried substantially spherical microparticulates, they return to their original predominantly spherical shape and size. This is most important in order to mimic the size and shape of oil droplets in oil-in-water emulsions. The more preferable size of from 5 to 30 microns is close to the optimum size most often present in the oil droplets in an oil-in-water emulsion. Also, the dried microparticulates can be readily rehydrated to soft, non-aggregated, non-gritty microparticulates that exhibit the desired creamy mouthfeel of an oil-in-water emulsion.

In the first embodiment of the process of the invention, step A) is carried out by forming microparticulates of the gel-forming hydrocolloid. Many methods are known for forming such microparticulates, such as by spraying aqueous hydrocolloid sols or mixtures into air, hot water, or an organic solvent, e.g., a $C_1$–$C_4$ alkanol, or by forming hydrocolloid aqueous emulsions with organic water-immiscible solvents. Also, it was discovered that microparticulates can be formed with cold melt konjac by aspirating aqueous hydrocolloid mixtures into hot water.

A particularly suitable spray process is carried out by heating a gel-forming hydrocolloid in water, at a concentration of hydrocolloid of from 1 to 20%, preferably 0.5 to 2.0% by weight, based on the weight of water. The resulting solution or sol is then treated, as needed, with a gelling cation such as potassium, calcium or magnesium. The resulting aqueous mixture is then converted to an aerosol form in air using a spray nozzle. The aqueous droplets solidify when the gel temperature for the particular hydrocolloid is reached.

Alternatively, the heated solution or suspension is emulsified in a hot oil with stirring at a temperature above the gelling temperature of the hydrocolloid, with the addition of a gelling cation as needed, either before or after emulsification. The temperature of the emulsion is then lowered while stirring is continued to produce the gelled microparticles. The oil is preferably a food grade oil such as a vegetable oil, including corn oil, peanut oil, sunflower oil, and olive oil. The ratio of hydrocolloid solution or suspension to oil is advantageously from 10:90 to 80:20, preferably from 30:70 to 60:40 by volume. The resulting microparticles are separated from the oil by filtration or centrifugation, and washed, e.g., with ethyl acetate or excess water to remove residual oil. It should be noted that the above emulsion process does not necessarily involve cooling of the system. For example, heat stable konjac microparticulates can be made by emulsifying an alkaline or pH adjusted cold-melt konjac sol in oil, and then heating the emulsion to gel the emulsified droplets into microparticulates.

In addition, microparticulates can be formed from the heated solution or suspension by changing the pH until gelling occurs; by the addition of synergistic hydrocolloid gelling agents; by spraying into a bath containing a gelling cation; or by metering in a gelling cation at the spray nozzle for conversion into an aerosol form.

In step B) of the first process embodiment, the hydrocolloid microparticulates formed in step A) preferably present in a concentration of from 0.2 to 20%, more preferably 0.5 to 5% by weight, are contacted with a solution of the water-soluble, non-gelling, hydration enhancing hydrocolloid in water. The concentration of the water-soluble hydrocolloid in water is not critical. Generally, a concentration of 0.01 to 10% by weight, preferably 0.5 to 2% by weight is employed. The temperature of the solution is also not critical, and external heating is not required. However, temperatures from 20° to 30° C. are conveniently employed. Contact time can be from 1 to 24 hours. The microparticles are then separated from the aqueous solution of water-soluble hydrocolloid by any suitable method such as by filtration or centrifugation. The separated microparticles are coated on the external surfaces thereof with the aqueous solution of the water-soluble hydrocolloid, or are carried in the aqueous solution depending on the quantity of aqueous solution present. In addition, since the microparticles contain pores which are large enough to admit the above solution, coating of the walls of the pores will occur, and although this is not required to obtain the benefits of this embodiment of the process for non-aggregation properties, it is required in order to obtain rapid and complete rehydration of the dried microparticles from step C) below.

In step C) of this process embodiment, the coated microparticles are dried. Specialized drying procedures are not required, and drying can be effected by any desired technique, such as by coagulating in a water-miscible organic solvent such as an alcohol, and then oven drying; forced hot air drying; spray drying; fluidized bed drying; azeotropic washing; freeze drying; vacuum drying; and the like, or any combination of the above. Especially useful as a coagulating solvent is isopropyl alcohol containing from 0 to 20% by volume of water. Oven drying alone can also be employed, but is not always uniformly satisfactory with some gel-forming hydrocolloids such as konjac.

The resulting substantially dry hydrocolloid microparticulates contain a layer of the water-soluble hydrocolloid occluded on the outside surfaces of the microparticles as well as an internal coating on the walls of the pores therein. This process is the preferred process for forming the dry microparticulates of the invention, since the dry microparticulates resulting from this embodiment of the process can be rehydrated to any desired extent and can be readily dispersed in water, regardless of the gel-forming hydrocolloid selected. Upon rehydration, the microparticulates reassume essentially the same size and shape they possessed prior to drying.

In the second process embodiment of the invention, a heated aqueous composition is formed containing the gel-forming hydrocolloid and the water-soluble hydrocolloid. The gel-forming hydrocolloid or mixture of hydrocolloids is present in a concentration of from 0.2 to 20%, preferably 0.5 to 5% by weight, and the water-soluble hydrocolloid is present in a concentration of from 0.01 to 10%, preferably 0.5 to 2% by weight. The above percentages by weight are based on the weight of water. Also present is the gelling cation, if needed, or the gelling cation can be added in step B). The heated aqueous composition is formed and maintained at a temperature above the gelling temperature of the gel-forming hydrocolloid.

Step B) of this second process embodiment is carried out as described above for step A) of the first process embodiment, i.e., hydrocolloid microparticulates are formed from the above heated aqueous composition, e.g., using a spray or emulsion procedure.

Step C), the drying step, is then carried out as disclosed above for step C) of the first process embodiment.

This second process embodiment produces dry, rehydratable, porous, non-aggregating, water-dispersible gel-forming hydrocolloid microparticulates containing the water-soluble hydrocolloid as part of the microparticulate structure. While the resulting microparticles can be dispersed in water, and have a much reduced tendency to aggregate when hydrated, their dispersion in water is not always as uniformly complete as with microparticulates produced by the first process embodiment.

It is also of course possible to combine both processes, such as by adding water-soluble hydrocolloid, which can be the same or different from that used in step B), to the aqueous solution or suspension of gel-forming hydrocolloid in step A) of the first process embodiment. In this process variation, the water-soluble hydrocolloid is present both internally and externally in the resulting microparticulates. This combined process variant is especially useful where gel-forming hydrocolloids or mixtures thereof are employed that normally produce severe aggregation problems with hydrated microparticulates formed from them.

Heat stable, cold-melt konjac glucomannan is advantageously employed as the gel-forming hydrocolloid for forming the microparticulates of the invention. Methods for the preparation of heat stable, cold-melt konjac glucomannan are disclosed in PCT patent application publication No. WO 93/02571 (PCT/US92/06591) which is incorporated herein by reference. A convenient method is as follows. Konjac powder is dissolved in water, by heating the water until a solution of the konjac powder is obtained. Generally, a temperature of from 50°–100° C., preferably 75°–95° C. can be employed. Then a water-soluble base or basic salt, preferably potassium carbonate, is added with mixing to the heated solution to a pH of 10 to 11.5 to form a konjac gel. The konjac gel is isolated from the remaining aqueous medium and cooled until the gel cold-melts into the form of a sol. Cooling is usually carried out at a temperature of from 0° to 10° C., preferably at 2° to 6° C. For use in a process of the invention for forming substantially dry, rehydratable, water-dispersible, porous, gel-forming hydrocolloid microparticulates, the sol from step C) above can be used as the gel-forming hydrocolloid in step A) of each process embodiment.

The microparticulates formed by the processes of the invention can be rehydrated to any desired extent, that is, controlled hydration can be effected, enabling a wide range of control over the consistency of the product. The dry microparticulates provide important commercial advantages in terms of storage and shipping space, shipping weight, and in the ability to accurately control the degree of rehydration. In addition, during storage and shipping, the possibility of microbial contamination is much reduced compared to hydrated microparticulates.

The microparticulates of the invention are especially useful when rehydrated as a bulking agent and for their organoleptic properties as a replacement for all or part of the fat components of comestibles. For this use, they may be part of a mixture that may also contain other ingredients such as texturizers like gelling carrageenans and/or konjac; mouthfeel imparting agents such as xanthan, locust bean gum, and guar gum; vitamin and mineral supplements, flavoring agents; oils; pigments like $TiO_2$; and the like.

The microparticulates of the invention when rehydrated can be used in place of all or part of a water-in-oil or oil-in-water emulsion in foodstuffs containing such emulsions, such as salad dressings, mayonnaise, sauces, gravies, desserts, milk products, puddings, fondues, dips, confections, ice cream, yogurt, mousse, frostings and icings and the like.

Another important use for the dry microparticulates of the invention is the encapsulation of various materials which are added to the aqueous hydrocolloid compositions prior to microparticulate formation. Such materials include natural flavoring agents; food additives such as synthetic flavoring agents, antioxidants and acidulants; food processing aids; medicinal and biological materials such as enzymes, fungicides, antibiotics, antibacterial agents, biocides, nutrients such as vitamins and minerals, hormones, cells, and the like; colorants; odorants; chromatography media; agglutination media for diagnostics; nephelometric enhancers; immobilization matrices; herbicides; insecticides; pesticides; animal feed supplements; fertilizers; surfactants; detergents; and immunoassay reagents. Also useful for encapsulation are pharmaceutical actives including, but not limited to: analgesics such as acetaminophen (APAP); antihistamines such as chlorpheneramine maleate; decongestants such as pseudoephedrine HCl; cough suppressants such as dextromethorphan HBr; antibiotics such as tetracyclines and erythromycins; anticonvulsants such as diphenylhydantoin; and thyroid stimulants such as laevothyroxine.

EXAMPLES

Example 1

Preparation of 1.0% w/w cold-melt konjac sol

Cold tap water (100 g) was weighed into a 250-ml beaker and the tare weight of water and beaker recorded. Using an overhead mixer, 1.0 g of konjac powder was suspended in the cold water. The konjac was added slowly to prevent clumping. With continuous agitation, this suspension was heated in a hot water bath at $\geq 85°$ C. approximately 60 minutes during which time the konjac powder became a sol. The beaker was placed on a balance and sufficient water added to replace that lost by evaporation. The added water was mixed thoroughly. To the konjac sol was added 0.75 ml of 1M potassium carbonate (0.75 ml/gram of konjac) and mixed in thoroughly using an overhead mixer. The konjac/potassium carbonate sol was heated in a hot waterbath until the temperature at the center reached 85° C. and was held at that temperature or slightly above for 20 minutes. The gelled konjac was removed from the waterbath, cooled to room temperature, and placed in an icebath to cold-melt the konjac gel to a sol (ca. 4° C.). The time required to obtain the cold-melt sol was approximately 2 hours. Longer periods are required for higher konjac concentrations and slicing the gel into small pieces helps reduce the amount of time needed to obtain a cold-melt sol. The thin skin on the surface of the cold-melt sol, which frequently formed, was removed.

The pH of the konjac cold-melt sol can be adjusted to any level without affecting subsequent gelation.

Example 2

Formation of konjac heat stable cold-melt microparticulates

To 100 g of the konjac sol prepared in Example 1, was added 0.10 g of carboxymethylcellulose (CMC) dissolved in 10 ml of cold water. While maintaining the sol mixture at ice-bath temperature (0°–4° C.), the sol mixture was neutralized by adding a sufficient quantity of 0.1N HCl to adjust the pH to 7.0, while stirring and monitoring with a pH meter probe. A Silverson® L4R mixer was set up with the emulsion screen on the standard two-arm mixing unit. Using a ringstand and clamp, a 1500-ml beaker containing 1 liter of preheated (ca. 90° C.) Wesson® oil was placed in a boiling water bath located on the Silverson® mixer platform under the emulsifier. The mixing arm was lowered into the hot oil and the mixer started at the maximum setting. The neutralized, CMC-containing, cold-melt konjac sol was slowly added, by pouring, to the heated oil. After the addition of the sol to the hot oil was completed, mixing was continued for one minute. The aqueous, microparticulate-containing layer was distributed into 150-ml centrifuge bottles (ca. 125 ml in each), about 25 ml of 30% isopropyl alcohol containing 0.01% CMC was added to each, the bottles were balanced, and then centrifugation was effected at 6000 rpm for 10 minutes, during which time a pellet formed which contained the microparticulates. The oil layers were removed by decantation, combined, and held for reuse. The aqueous alcohol layer was then removed, also by decantation. The pelleted microparticulates were combined using about 3×volume of 0.1% CMC (aq.) solution, followed by redispersion using a Silverson® mixer, again using the maximum speed setting. This dispersion, containing the microparticulates, was transferred to 50-ml centrifuge tubes and centrifuged at 1000 rpm for 5 minutes to remove debris and large beads and aggregates. The pellets were discarded and the supernatants, containing the microparticulates, were combined and boiled for one hour using a stirring hot plate. The Silverson® mixer was again used to ensure complete suspension and another 5 minute, 1000 rpm cycle used to remove gel debris. (if desired, the microparticulates can be pelletized by centrifugation at 4000 rpm for 10–15 minutes). Microparticulates obtained by this procedure contained 94% water and 0.48% oil (by ether extraction method). Room temperature storage stability of the microparticulates was achieved by two methods. The first of these was by transferring the microparticulates to 30% (v/v) isopropyl alcohol (aq) and the other was by suspending them in 1% aqueous CMC and Coagulating this suspension in isopropyl alcohol, recovering the coag, then drying.

Variations of this procedure gave the following results:

| VARIABLE | RESULT |
| --- | --- |
| Mixing time | |
| 1 minute | small microparticulates (1–20 microns) |
| 5 minutes | larger microparticulates (20–200 microns) |
| Temperature of oil | |
| 50° C. | mixture of sizes |
| 65° C. | good, small microparticulates |
| 85° C. | good, small microparticulates |
| 90° C. | Very good, small microparticulates |
| Mixer/chamber | |
| Waring ® blender | variable ratios of microparticulates and debris, depending on the chamber used |
| Silverson ® mixer | good to very good microparticulates depending on the temperature and speed |
| Ratio of cold-melt sol to oil | |
| 1:10 | very good small microparticulates |
| 1:1 | good microparticulates, some debris |
| Surfactant added to oil | |
| Tween ® 80 (polyoxyethylene (20)-sorbitan mono-oleate) | no discernible effect |
| Other oil used | |
| Castor oil | good microparticulates but more difficult to recover |
| Konjac preparation used | |
| Crude | good microparticulates, considerable debris |
| Alcohol washed | good microparticulates, less debris |
| Clarified | goods microparticulates, little debris |

Example 3

Formation of microparticulates by aspirating konjac cold-melt sol containing carboxymethylcellulose into hot water.

One liter of a 1.5% konjac cold-melt sol using clarified konjac was prepared by adding 15 g of clarified konjac to one liter of water and heating to 85° C. to effect dissolution. This sol was gelled by adding 7.5 ml of 1M $K_2CO_3$, followed by subsequent heating in a boiling water bath. This gel was then placed in an ice bath to produce the cold-melt konjac sol. To this was added 0.1 g of carboxymethyl cellulose (CMC) dissolved in 15 ml of water and the sol was then neutralized using 0.1N HCl. Portions of this were drawn through an aspirator into a stream of hot water. Small microparticulates were formed, along with fine debris. The microparticulates were collected by centrifugation.

The microparticulates were dried overnight in a forced air oven. When the dried microparticulates were rehydrated by the addition of water, the rehydrated microparticulates separated into individual entities and did not agglomerate.

Example 4

Preparation of cold-melt konjac microparticulates followed by treatment with carboxymethylcellulose solution Clarified konjac was used to prepare a 200 ml of 0.5% cold-melt konjac sol using the method described in Example 1. To this was added about 20 ml of a cold aqueous solution containing 0.02 g CMC. The sol was adjusted to pH 7 using 0.1N HCl. This sol was transferred to a chilled paint sprayer (Wagner Heavy Duty Power Painter®, Wagner Spray Tech Corporation) bottle fitted with a trigger controlled nozzle. The cold-melt konjac sol was sprayed into a receiving tray containing 83% isopropyl alcohol (aq) at a depth of about one inch. The height of the sprayer nozzle (0.8 mm i.d.) to the surface of the alcohol was adjusted to about 18 inches and spraying was done so that heavy streaming was avoided. Excellent konjac microparticulates (25–100 micron diameter) were obtained. Smaller microparticulates were prepared using a 0.6 mm inside diameter sprayer tip, and in each case the microparticulates were recovered by centrifugation. The microparticulates were suspended in a 1% CMC aqueous solution and the mixture stirred at room temperature overnight. Two methods were used for drying, the first consisting of spreading the mixture in an appropriate vessel and drying overnight in a forced-air oven. The second method used was coagulation of the suspension in isopropyl alcohol, recovering the coagulate, then drying it in a forced-air oven at 55° C. When water was added to the dried ground microparticulates and the mixture dispersed using a Silverson® L4A homogenizer, the rehydrated microparticulates separated into individual entities and did not aggregate.

Example 5

Preparation of carrageenan microparticulates co-dried with carboxymethylcellulose A 2.0% by weight of K-carrageenan in distilled water at about 85° C. was sprayed into the air to form microparticulates, using the spray equipment of Example 4. The resulting carrageenan microparticulates were divided into four equal portions and each portion was treated and dried or just dried by one of the following procedures:

A) coagulation in 1 volume of 99% isopropyl alcohol, followed by oven drying;

B) mixing the microparticulates with an equal volume of 1% carboxymethylcellulose, then coagulation of the mixed microparticulates with 1 volume of 99% isopropyl alcohol, followed by oven drying;

C) oven drying the water slurry of microparticulates directly;

D) mixing the microparticulates with an equal volume of 1% carboxymethylcellulose, followed by oven drying.

The dried microparticulates were evaluated by dispersing coarsely-ground particles with low-shear mixing in a quantity of water equal to the original hydrated microparticulate weight, then the microparticulates were allowed to rehydrate for 1 hour, followed by high shear mixing in a Silverson® mixer. Visual observation of the resulting sols was made, and the microparticulates were examined under a microscope for degree of rehydration and dispersion/aggregation.

The results are set forth in Table 1 below:

TABLE 1

| Treatment and Drying Procedure | Sol | Microparticulates Rehydration | Dispersion |
|---|---|---|---|
| A | soft paste | incomplete, many small microparticulates | good, no aggregation |
| B | viscous sol | complete, rounded microparticulates | good, no aggregation |
| C | 100% settling | poor, mostly shrunken microparticulates | poor, aggregation |
| D | 50% settling | partial, many shrunken microparticulates | good, no aggregation |

While the oven dried microparticulates of Treatment D did not rehydrate completely in a 1 hour treatment period with water, longer hydration times resulted in substantially complete hydration.

Example 6

Preparation of heat stable konjac microparticulates with and without carboxymethyl cellulose.

A) A 2.0% by weight hot solution of konjac sol was sprayed using the spray equipment of Example 4. Before the hot solution of konjac sol reached the spray nozzle, a 10% by weight aqueous solution of $K_2CO_3$ was metered in at a rate that provided 0.2 g of $K_2CO_3$ per gram of konjac. The resulting konjac microparticulates were partially dehydrated in 2 volumes of 85% isopropyl alcohol, the partially dehydrated microparticulates collected by vacuum filtration, and dried in a forced air oven for 2 hours at 140° F. [60° C.].

B) Partially dehydrated konjac microparticulates were prepared according to the procedure given in A) above, except that the 2.0% hot solution of cold-melt konjac sol also contained 0.7% by weight of carboxymethyl cellulose.

C) One gram of the microparticulates prepared according to procedure A) above was dispersed in 100 g of distilled water using low shear mixing. One gram of the microparticulates prepared according to procedure B) above was also dispersed in 100 g of distilled water using the low shear mixing. Both dispersions were gently stirred for 10 minutes and allowed to stand without stirring for periods of 10 minutes, 1 hour, 2 hours, and 24 hours. After standing for each of the above periods, a sample was removed and centrifuged at 2000 rpm in a graduated centrifuge tube. The comparative degree of rehydration was determined by measuring the volume of the microparticulates after centrifugation.

The results are set forth in Table 2 below.

TABLE 2

| holding time | sample A (no CMC) rehydration volume | sample B (with CMC) rehydration volume |
|---|---|---|
| 10 minutes | 6 ml | 20 ml |
| 1 hour | 8 ml | 25 ml |
| 2 hours | 8 ml | 25 ml |
| 24 hours | 8 ml | 25 ml |
| 2 hours* | 8 ml | 50 ml |

*This sample was subjected to high shear in a Silverson ® homogenizer for 3 minutes.

As can be seen from the results obtained in Table 2, the partially. dehydrated microparticulates from procedure A did not rehydrate even after a 24 hour period. These microparticulates had a dry, gritty texture and could not be used as a fat substitute in a low fat comestible. The partially dehydrated microparticulate samples from procedure B on the other hand rehydrated well and had a smooth, creamy, fat-like feel. These rehydrated microparticulates are highly effective and useful as a fat substitute in low fat comestibles.

Example 7

Preparation of konjac microparticulates with starch

Konjac/starch microparticulates were made by the following process:

Forty grams of konjac flour was dispersed in 600 grams of 60° C. water in a food processor for 15 minutes to form a smooth paste. Forty grams of pre-gelatinized starch (National 1215) and 40 grams of potato starch (Avebe Perfectamyl® D-12) were added to the paste, followed by 130 grams of water. This was mixed for 15 additional minutes. The material was then cooled to 25° C. and placed in a Hobart® mixer. Twelve grams of trisodium phosphate pre-dissolved in 100 grams of water was added. The konjac-starch paste was poured into crystallizing dishes, and left overnight in a refrigerator at 10° C. The gels were particulated using a Silverson® mixer at high speed.

The resulting microparticulates were divided into three equal portions, and each portion dried by one of the procedures (I–III) set forth below.

I) drying in one Volume of 98% isopropyl alcohol.

II) mixing with an equal volume of a 1% solution of carboxymethylcellulose and then coagulating in one volume of 98% isopropyl alcohol.

III) air drying the microparticulates directly in a 50° C. forced air oven.

The dried microparticulates were evaluated by dispersing 1 gram of the microparticulates in 100 grams of water. The microparticulates were allowed to rehydrate for one hour, subjected to shear in a Silverson® mixer, and observed. The results obtained are set forth in Table 3 as follows:

TABLE 3

| Treatment and drying conditions | Dispersibility |
|---|---|
| I (98% IPA) | good |
| II (1% CMC + IPA) | good |
| III (oven drying) | poor |

Example 8

Preparation of oil-encapsulated konjac microparticulates

Clarified konjac was used to prepare 250 ml of 0.5% cold-melt konjac sol using the method described in Example 1. Using a Silverson® L4A homogenizer at maximum speed with the emulsion screen in place, 250 ml of Wesson® oil, at room temperature was added to the 250 ml of cold-melt konjac sol. Upon completion of the addition, emulsification was continued for one minute.

To the resulting oil-encapsulated konjac microparticulates there was added 300 ml of a 0.01% solution of carboxymethyl cellulose in aqueous isopropyl alcohol (30%). This mixture was stirred for one hour. An equal amount of 85% isopropyl alcohol was added and the mixture allowed to stand overnight. The microparticulates were recovered by centrifugation and dried at 55° C. in a forced air oven. When water was added while mixing, the microparticulates rehydrated well and were non-aggregated.

Example 9

Ranch style dressing formulations.

Four ranch style dressing formulations (Formulations A through D) are made by the following procedure:

A dry blend is made containing sugar, buttermilk powder, xanthan gum, potassium sorbate, calcium disodium EDTA, and egg yolk powder. This dry blend is dispersed into water using high shear, and mixed for 10 minutes. Vinegar, salt, mustard powder, and buttermilk flavor are then added to the dispersion, followed by the addition of rehydrated konjac microparticulates prepared by the process of Example 2 and/or vegetable oil. Then garlic powder, onion powder, ground black pepper, and parsley are added, and the resulting dressing formulation mixed for 5 minutes.

The composition of each formulation is given in Table 4 below.

TABLE 4

| Ingredient | FORMULATION A FULL FAT % | weight | FORMULATION B NO FAT % | weight | FORMULATION C 10% FAT, 35% BEAD % | weight | FORMULATION D 10% FAT, 25% BEAD % | weight |
|---|---|---|---|---|---|---|---|---|
| Water | 48.35 | 241.75 | 49.44 | 247.2 | 38.89 | 194.45 | 49.44 | 247.2 |
| Vinegar-120-gr. | 5 | 25 | 5 | 25 | 5 | 25 | 5 | 25 |
| Sugar | 4 | 20 | 4 | 20 | 4 | 20 | 4 | 20 |
| Buttermilk Powder | 3.5 | 17.5 | 3.5 | 17.5 | 3.5 | 17.5 | 3.5 | 17.5 |
| Egg Yolk Powder | 0.5 | 2.5 | 0.5 | 2.5 | 0.5 | 2.5 | 0.5 | 2.5 |
| Salt | 2 | 10 | 2 | 10 | 2 | 10 | 2 | 10 |
| Xanthan Gum | 0.4 | 2 | 0.4 | 2 | 0.4 | 2 | 0.4 | 2 |
| Garlic Powder | 0.27 | 1.35 | 0.09 | 0.45 | 0.09 | 0.45 | 0.09 | 0.45 |
| Onion Powder | 0.27 | 1.35 | 0.09 | 0.45 | 0.09 | 0.45 | 0.09 | 0.45 |
| Gr. Blk Pepper | 0.23 | 1.15 | 0.06 | 0.3 | 0.06 | 0.3 | 0.06 | 0.3 |
| Ca Disodium EDTA | 0.01 | 0.05 | 0.01 | 0.05 | 0.01 | 0.05 | 0.01 | 0.05 |
| Parsley | 0.02 | 0.1 | 0.01 | 0.05 | 0.01 | 0.05 | 0.01 | 0.03 |
| Mustard Powder | 0.05 | 0.25 | 0.05 | 0.25 | 0.05 | 0.25 | 0.05 | 0.25 |
| Konjac Microparticulates | 0 | 0 | 34.45 | 172.25 | 35 | 175 | 24.45 | 122.25 |
| Buttermilk Flavor | 0.3 | 1.5 | 0.3 | 1.5 | 0.3 | 1.5 | 0.3 | 1.5 |
| vegetable oil | 35 | 175 | 0 | 0 | 10 | 50 | 10 | 50 |
| potassium sorbate | 0.1 | 0.5 | 0.1 | 0.5 | 0.1 | 0.5 | 0.1 | 0.5 |
| TOTAL | 100 | 500 | 100 | 500 | 100 | 500 | 100 | 500 |

Formulation A is made as a full fat control formulation. Formulation B is a no fat formulation. This formulation, in which rehydrated cold-melt konjac microparticulates are used in place of all of the vegetable oil, possesses good organoleptic properties. Formulation C which contained 10% vegetable oil and 35% rehydrated konjac microparticulates, and Formulation D which contains 10% vegetable oil and 25% rehydrated konjac microparticulates, are similar in both texture and flavor to full fat Formulation A, and exhibit excellent organoleptic properties.

Example 10

Ranch style dressing formulations

Three ranch style formulations (Formulations E through G) are made by the procedure of Example 9 except that rehydrated carrageenan microparticulates prepared in accordance with the procedure of Example 5 (drying procedure B) are substituted for rehydrated konjac microparticulates in Formulations B through D respectively.

Formulation E possesses good organoleptic properties, and Formulations F and G possess excellent organoleptic properties, and are similar in both texture and flavor to full fat Formulation A.

Example 11

Mayonnaise type dressing (3–25% fat).

A spoonable mayonnaise type dressing is prepared containing the following ingredients:

| Ingredients | % by wt. |
| --- | --- |
| Water | QS |
| rehydrated carrageenan microparticulates | 5.0–50.0 |
| vegetable oil (soybean) | 3.0–25.0 |
| sugar | 6 |
| Avicel ® CL-611 (microcrystalline cellulose) | 3.5 |
| Vinegar (120 gr.) | 3.5 |
| Salt | 2.5 |
| Gelex ® Instant Starch-Amaizo ™ | 1.0–4.0 |
| Egg Yolk Solids — Hanningson's type Y-1 | 1.5 |
| lemon juice | 1 |
| Xanthan Gum-Keltrol ® | 0.4 |
| Viscarin ® SD 369 (carrageenan powder) | 0–0.3 |
| Mustard Powder | 0.25 |
| potassium sorbate | 0.1 |
| Quest ® Mayonnaise Flavor 7R 13774 | 0.1 |
| Ca disodium EDTA | 0.01 |
| Carotenal Solution (1.4% Beta Carotene) | 0.0015 |
| TOTAL | 100.00 |

The above dressing is prepared as follows:

The microcrystalline cellulose is mixed with the water for 5 minutes in a Silverson® mixer. The carrageenan powder, if present, is dry blended with part of the sugar and added to the above water mixture and mixed for 5 minutes in the bowl of a Hobart® mixer. A dry blend of xanthan gum, egg yolk solids, starch, the remainder of the sugar, and potassium sorbate is prepared and added slowly with mixing to the bowl of the Hobart mixer, with mixing continuing for 10 minutes. Rehydrated carrageenan microparticulates, prepared by the process of Example 5 (drying procedure B) are slowly added to the bowl. The vegetable oil, beta carotene, and mayonnaise flavor are blended, added to the bowl and mixed for 5 minutes. Then the lemon juice, vinegar, and calcium disodium EDTA are slowly added to the bowl with mixing. A blend of salt and mustard powder are added and mixed until smooth-(about 10 minutes). The resulting mixture is then milled in a Fryma® mill at 0.3 mm, followed by de-aeration.

The mayonnaise type dressing so produced is spoonable, homogeneous, and possesses organoleptic properties similar to those of a full fat mayonnaise.

Example 12

Spread formulation (margarine type) containing 20 to 35% fat.

A spread formulation containing from 20 to 35% by weight of fat is formulated to contain the following ingredients:

| Aqueous Phase Ingredients | % by wt. |
| --- | --- |
| Avicel ® RC-591F (microcrystalline cellulose) | 0.7 to 2.0 |

-continued

| Aqueous Phase Ingredients | % by wt. |
| --- | --- |
| Rehydrated microparticulates* | 5.0 to 25.0 |
| xanthan** | 0.07 to 0.2 |
| NaCl | 1.80 |
| K Sorbate | 0.20 |
| Maltrin ® 040 | 5.00 |
| flavor | 0.05 |
| water | QS |

*the rehydrated microparticulates are either rehydrated konjac microparticulates prepared by the process of Example 2 or carrageenan microparticulates prepared by the process of Example 5 (drying procedure B). They are used as a 1:1 replacement for oil/fat based on a 40% fat content.
**Iota carrageenan powder can also be included in addition to xanthan gum in a range of from 0.05 to 0.30% to enhance mouthfeel.

| Lipid Phase Ingredient | % by wt. |
| --- | --- |
| soy oil | 11.5 |
| Ingot Soya | 7.15 |
| palm oil | 5.65 |
| Dimodan ® OK[1] | 0.35 |
| Triodan ® R-90[1] | 0.25 |

[1]Emulsifiers

The above lipid phase is based on a spread formulation containing 25% fat content. The above formulation can be varied to provide a spread formulation containing a lipid phase of from 20 to 35% and an aqueous phase of from 65 to 80%.

The above spread formulation is prepared as follows:
Aqueous Phase

The microcrystalline cellulose is dispersed in the water in a Silverson® mixer. Xanthan gum is then added with mixing. The remaining aqueous phase ingredients, except for the rehydrated microparticulates, are mixed into the above dispersion. The rehydrated microparticulates are added using minimum agitation to preserve their structural integrity. The resulting aqueous mixture is heated to to 50° C. just prior to forming an emulsion with the lipid phase.
Lipid Phase The ingot soya is melted in a hot water bath. The emulsifiers are then added to the liquid ingot soya at a temperature of 80°–85° C. The soy and palm oil are heated together in a steam kettle to 65° C. The ingot soya-emulsifier mixture is cooled to 65° C. and added to the soy and palm oil. The resulting mixture is then held for 15 minutes to temper the fat, and the mixture cooled to 50° C.
Emulsion formation Using agitation in a Lightnin® mixer containing the lipid phase, the aqueous phase is added slowly to avoid the incorporation of air into the mixture. When the two phases are completely combined in the form of a water-in-oil emulsion, the mixture is passed through a margarine crystallizer to form the finished spread.

The finished spread has organoleptic properties similar to those of a full fat (40%) margarine spread.

Example 13

Preparation of a reduced fat shortening containing rehydrated cold-melt konjac microparticulates.

The quantities of Crisco® shortening given below are weighed and placed into Hobart® mixing bowls along with 0.2–1.0 wt % (based on total weight of shortening and microparticulates) of a low HLB surfactant such as sorbitan monostearate, distilled monoglycerides, or polyglycerol esters. Rehydrated cold-melt konjac microparticulates prepared according to procedures B and C of Example 6 (2 hour rehydration period) are added in the quantities given below, except for the control. Homogeneous mixtures are formed by mixing the above components in the Hobart® mixing bowls for about 5 minutes.

| Component | Grams | | | |
|---|---|---|---|---|
| rehydrated konjac microparticulates | 0 | 5 | 15 | 30 |
| low HLB surfactant | 0.5 | 0.5 | 0.5 | 0.5 |
| Crisco ® shortening | 99.5 | 94.5 | 84.5 | 69.5 |

Each of the above three compositions containing rehydrated konjac microparticulates are substantially similar to and essentially indistinguishable from the composition containing only the Crisco® shortening.

Example 14

Preparation of a reduced fat shortening containing rehydrated carrageenan microparticulates The process of Example 13 is repeated except that rehydrated carrageenan microparticulates prepared according to Example 5 (drying procedure B) are used.

Each of the resulting three compositions containing rehydrated carrageenan microparticulates are substantially similar to and essentially indistinguishable in mouthfeel from the composition containing only the Crisco® shortening.

We claim:

1. A process for the preparation of substantially dry, rehydratable, water-dispersible, gel-forming, porous hydrocolloid microparticulates which comprise:
   (a) a gel-forming hydrocolloid which comprises a matrix of the porous microparticulates; and
   (b) at least one water-soluble, non-gelling, hydration-enhancing hydrocolloid; wherein the component (a) matrix contains component (b) internally within its porous structure, and wherein component (b) may be on at least a portion of the outer surfaces of the microparticulates comprising the steps of
   (a) forming hydrocolloid gel microparticulates from the gel-forming hydrocolloid,
   (b) contacting the hydrocolloid microparticulates with at least one water-soluble, non-gelling, hydration enhancing hydrocolloid in an aqueous medium, and
   (c) drying the resulting hydrocolloid microparticulates.

2. The process of claim 1 wherein the microparticulates in step A) have an average particle size diameter of from about 0.1 to about 150 microns.

3. The process of claim 2 wherein the microparticulates are substantially spheroidal in shape.

4. The process of claim 1 wherein in step A) the gel-forming hydrocolloid is heat stable cold-melt konjac.

5. The process of claim 1 wherein step C) is carried out by either air drying, spray drying, oven drying, fluidized bed drying, freeze drying, vacuum drying, or coagulating with a water-miscible organic solvent followed by oven drying.

6. The process of claim 5 wherein drying is carried out using isopropyl alcohol containing from 0 to about 20% by volume of water, followed by oven drying.

7. A process for the preparation of substantially dry, rehydratable, water-dispersible, gel-forming, porous hydrocolloid microparticulates which comprise:
   (a) a gel-forming hydrocolloid which comprises a matrix of the porous microparticulates; and
   (b) at least one water-soluble, non-gelling, hydration-enhancing hydrocolloid; wherein the component (a) matrix contains component (b) internally within its porous structure, and wherein component (b) may be present on at least a portion of the outer surfaces of the microparticulates comprising the steps of A) forming an aqueous composition comprising at least one gellable hydrocolloid and at least one water-soluble, non-gelling, hydration enhancing hydrocolloid, B) forming hydrocolloid gel microparticulates from the composition of step A), and C) drying the resulting hydrocolloid microparticulates.

8. The process of claim 7 wherein the microparticulates in step B) have an average particle size diameter of from about 0.1 to about 150 microns.

9. The process of claim 8 wherein the microparticulates are substantially spheroidal in shape.

10. The process of claim 7 wherein in step A) the gellable hydrocolloid is heat stable cold-melt konjac.

11. The process of claim 7 wherein step C) is carried out by either air drying, spray drying, oven drying, fluidized bed drying, freeze drying, vacuum drying, or coagulating with a water-miscible organic solvent followed by oven drying.

12. The process of claim 11 wherein drying is carried out using isopropyl alcohol containing from 0 to about 20% by volume of water followed by oven drying.

* * * * *